INVENTORS
E. P. BROWNING
R. C. TEFFT

*INVENTORS*
E. P. BROWNING
R. C. TEFFT

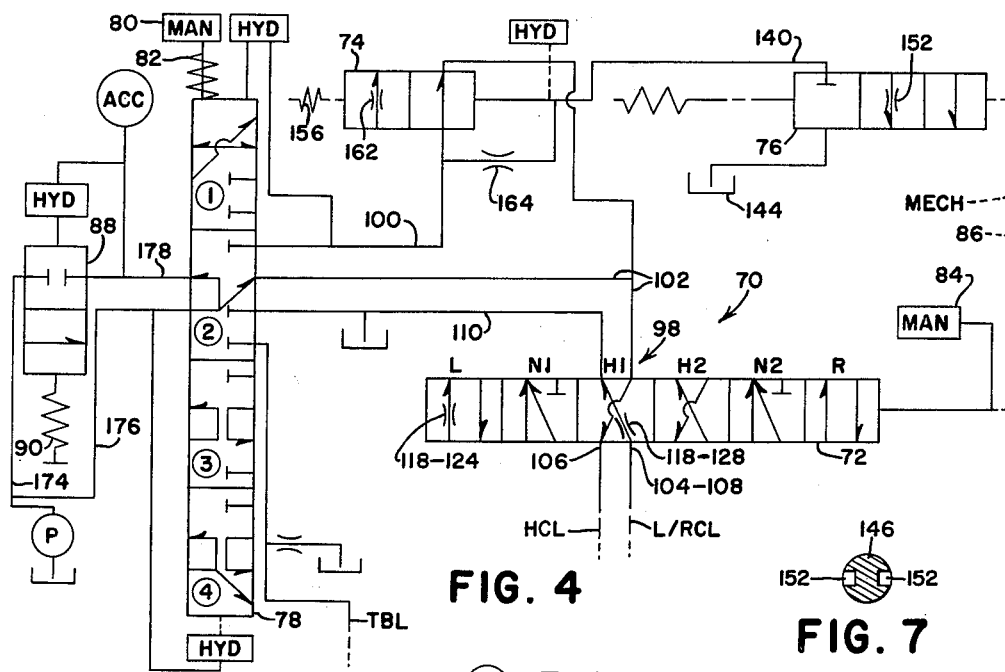
FIG. 4
FIG. 7
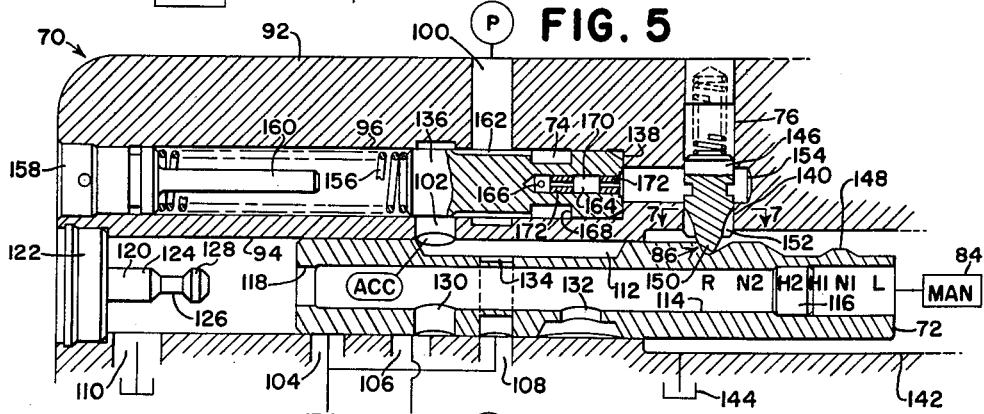
FIG. 5
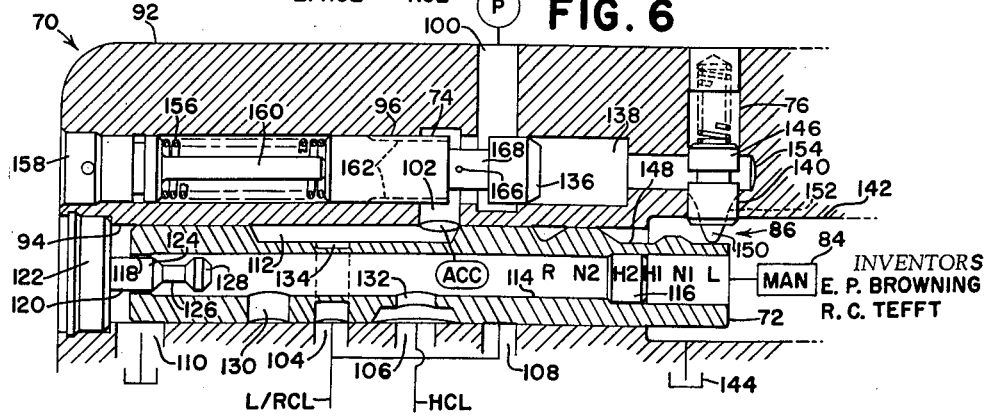
FIG. 6
INVENTORS
E. P. BROWNING
R. C. TEFFT United States Patent Office 3,078,673
Patented Feb. 26, 1963

3,078,673
HYDRAULIC CONTROL SYSTEM FOR TRANSMISSION AND THE LIKE
Edgar P. Browning and Robert C. Tefft, Waterloo, Iowa, assignors to Deere & Company, Moline, Ill., a corporation of Delaware
Filed May 27, 1960, Ser. No. 32,179
20 Claims. (Cl. 60—51)

This invention relates to a hydraulic control system and more particularly to such system as applied to the control of an automotive vehicle transmission of the dual-range forward-reverse type.

A good example of the general type of transmission to which the invention is especially adapted is disclosed in the U.S. patent to DuShane 2,710,546. In that transmission, an input shaft is capable of driving a countershaft at either of two speeds forward or one speed in reverse, and the countershaft in turn is selectively connectible to the output shaft by speed-change gearing, with the result that the number of forward speeds may be doubled by alternating between high and low range speeds in the countershaft, and the number of forward speeds may be repeated in reverse by operating the countershaft in its reverse range. The range-change means in the patented transmission includes high-, low- and reverse-ratio pinions with appropriate preferably synchronized clutches to effect the range selection. In a modified form of that transmission, the synchronized clutches are replaced by a pair of hydraulically operated friction clutches, one of which is associated with reverse mechanism so as to perform a dual function; that is, in both the forward-forward or high-low range and in the forward-reverse range, the same two clutches are alternately engageable.

It is important in a transmission of this type, especially in the forward-forward range, that the change in range ratio be effected without loss of forward momentum, and for this reason it is desirable that the change from one clutch to the other be effected as rapidly as possible. On the contrary, in the forward-reverse range, because of the change of direction involved, it is desired that the change be effected more gradually.

It is therefore a principal object of the present invention to provide an improved hydraulic control system capable of operating associated hydraulic motor means in such manner that at certain times rapid operation can be effected and at other times relatively slower operation may be achieved. It is a further object of the invention to provide such hydraulic control system with a control or selector valve of relatively simple design when considered with regard to the number of functions that it performs. Further objects reside in the association in the system of a control valve, a selector valve and an accumulator, with provision being made for controlling the rate of pump fluid flow to the clutch motors so that the two rates of clutch engagement may be achieved; provision for operating the control valve so as to effect a condition in which the rate-control means is by-passed; provision for giving the operator a choice of accomplishing slow clutch engagement even though the valve is conditioned for fast operation; and an improved metering valve and regulating or dump valve associated therewith.

The foregoing and other important objects and desirable features inherent in and encompassed by the invention will become apparent as a preferred embodiment thereof is disclosed in detail in the ensuing description and accompanying sheets of the drawings, the figures of which are described below.

FIG. 4 is a similar schematic view but showing the control valve in a position different from that in which it appears in FIGS. 1, 2 and 3.

FIG. 5 is an enlarged fragmentary sectional view of the selector valve and associated metering and regulating valves, the selector valve being illustrated in its reverse position.

FIG. 6 is a view similar to FIG. 5 but showing the selector valve in its low position.

FIG. 7 is a fragmentary section as seen along the line 7—7 of FIG. 5.

Figure 1:
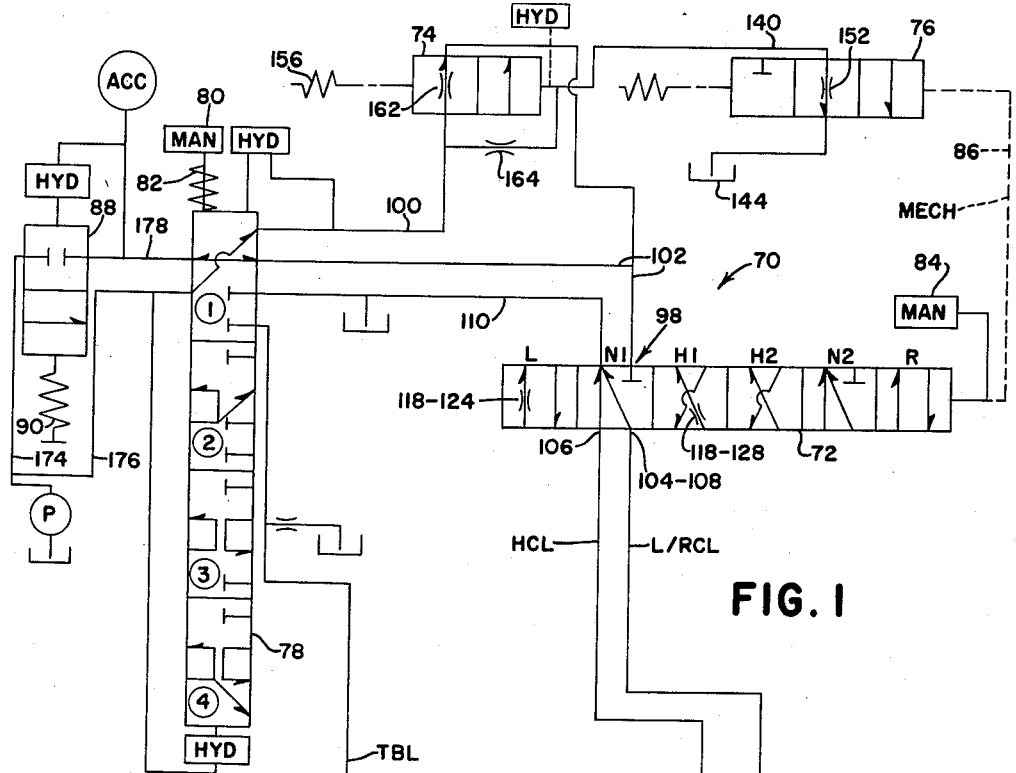
FIG. 1 is a schematic and partly sectional view showing the hydraulic circuit in association with a transmission having a two-speed forward, one-speed reverse countershaft.
Figure 1:
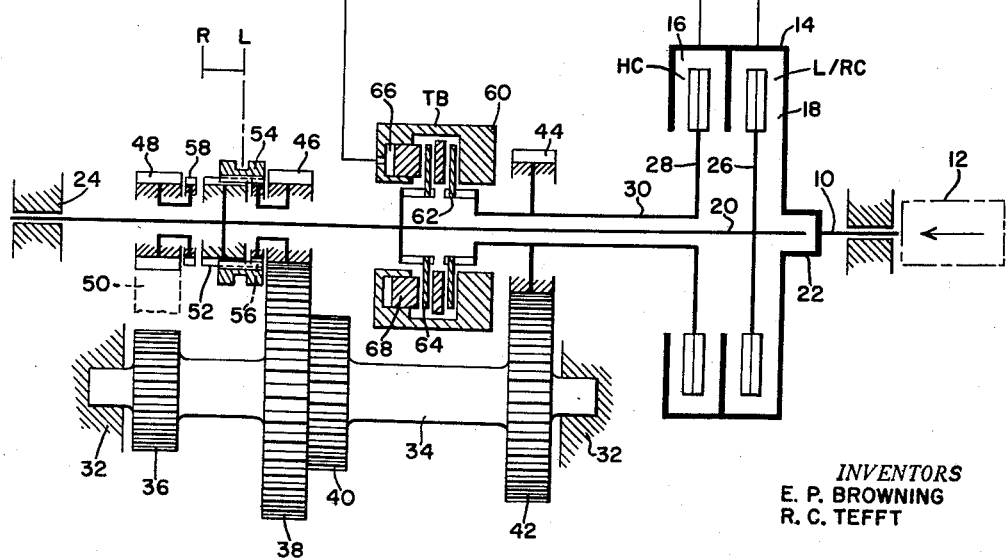
Figure 2:
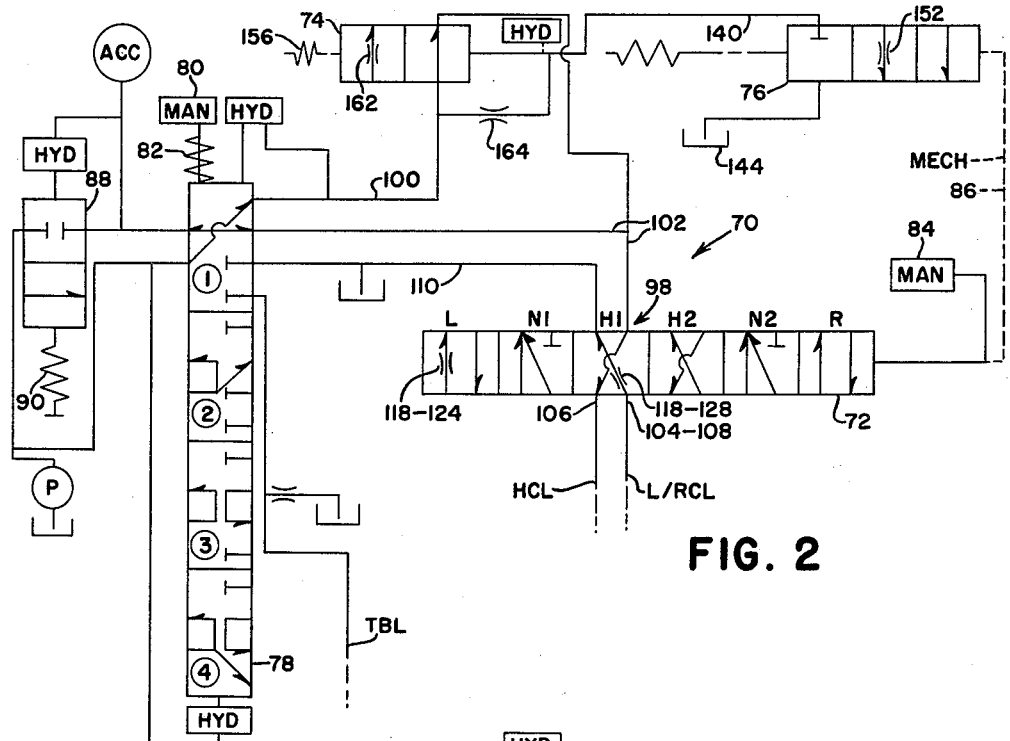
FIG. 2 is a view similar to the schematic part of FIG. 1 but showing the selector valve in a different position.

The transmission chosen for purposes of illustrating the invention in the environment for which it was especially designed includes an input shaft 10 which may be driven by any suitable power source, such as an internal combustion engine illustrated schematically at 12. The input shaft 10 is keyed to a clutch housing 14 which is common to two clutches. One of these clutches is a high-range clutch HC and the other a low-reverse clutch L/RC. The clutches are preferably hydraulically operated and the housing 14 is so constructed as to afford a pair of fluid-pressure-receivable chambers, 16 for the clutch HC and 18 for the clutch L/RC. A driven shaft 20 is coaxial with but separate from the input shaft 10 and may be journaled at its forward end in a portion of the clutch housing 14, as at 22, and is journaled at its rear end at 24 in a portion of what may be regarded as the transmission casing, it being understood that the particular transmission shown here is intended for use in an automotive vehicle, preferably an agricultural or industrial tractor.

Keyed to the forward end of the driven shaft 20 is a clutch plate 26 which represents the driven member of the low-reverse-speed clutch L/RC, and this member may be pressure loaded by a piston (not shown) operative in the chamber 18. Many examples of fluid-operated clutches of this type are well known and further details are deemed to be unnecessary. The chamber 16 for the clutch HC similarly operates in conjunction with a driven member 28 for a high-speed driven shaft 30 which is tubular and which concentrically surrounds the low-reverse shaft 20. It will be understood that the clutches HC and L/RC are alternately pressurizable to connect and disconnect the driven members 26 and 28 and therefore to selectively drive the driven shafts 20 and 30.

Additional portions of the transmission casing, as at 32, journal a countershaft 34 which has fixed thereto four countershaft gears 36, 38, 40 and 42. The gear 42 is in constant mesh with a high-speed pinion 44 which is keyed to the high-speed driven shaft 30. Thus, when the clutch HC is engaged, the countershaft 34 will be driven at a range ratio determined by the gear ratio between the gears 44 and 42.

The countershaft gear 38 is in constant mesh with a low-speed pinion 46 which is journaled on the low-reverse shaft 20. Additionally, the shaft 20 journals a reverse pinion 48 which is in constant mesh with a reverse idler 50 and that in turn is in constant mesh with the countershaft gear 36. The low and reverse pinions 46 and 48 are axially spaced apart on the shaft 20 and this shaft has keyed thereto axially intermediate the pinions an externally splined driven member 52 on which an internally splined clutch collar 54 is selectively axially shiftable between low and reverse positions, as indicated by the legend on the drawing. As shown in FIG. 1, the collar 54 is in engagement with clutch teeth 56 on the low pinion 46. Thus, when the clutch L/RC is engaged (and the clutch HC is disengaged) the countershaft 34 will be driven in a forward direction at the ratio determined by the gear ratio between the pinion 46 and the countershaft gear 38. By means of mechanism not important here, the clutch collar 54 may be shifted rearwardly so that it engages clutch teeth 58 on the reverse pinion 48, thereby connecting the shaft 20 to the reverse pinion 48 so that when the clutch L/RC is engaged, while the clutch HC is disengaged, the countershaft 34 wil be driven in a reverse direction at the speed ratio determined by the gear ratio between the pinion 48, gear 50 and countershaft gear 36. Accordingly, the basic part of the transmission is capable of producing two speeds forward and one speed in reverse. As shown in the above identified DuShane patent, the output shaft (not shown) is connected to the counter shaft in such manner as to produce four speed ratios. Because of the dual forward nature of the range part of the transmission, the number of forward speeds may be doubled so as to produce eight speeds forward. Four of these speeds can be used in reverse when the selector collar 54 is shifted to its reverse position so as to connect the reverse pinion 48 to the shaft 20.

For the purpose of facilitating connection and disconnection of the clutches involved in the transmission, a transmission brake TB is provided. This may be incorporated in another portion 60 of the transmission casing and includes a plurality of brake plates, one of which is shown at 62 as being connected to the tubular shaft 30 and the other of which at 64 is connected to the driven shaft 20. The housing portion 60 affords a fluid-pressure-receivable chamber 66 within which a ring-like piston 68 is movable to selectively apply pressure to the plates 62 and 64 and the intervening plate so as to apply the brake and thereby to retard rotation of the shafts 20 and 30. The control of the brake TB and its relation to the remainder of the system will be elaborated below.

Alternate engagement of the clutches HC and L/RC is effected by means of selector valve means designated in its entirety by the numeral 70 and including a selector valve 72, a metering or rate-control valve 74 and a regulating or metering valve dump valve 76. The selector valve means 70 is further coordinated with a control valve 78 which may be manually operated, as by means of a clutch pedal, as schematically represented at 80. The control valve 78 has four positions, here designated as numbers 1, 2, 3 and 4, and is spring loaded at 82 to its No. 1 position. The selector valve 70 may also be manually operated, as indicated schematically at 84, and this manual control may be any suitable selector lever, the details of which are not material here. A representative type of control forms the subject matter of U.S. Patent 2,775,134. As will be clear from the subsequent description of FIGS. 5 and 6, the selector valve 72 and metering valve dump valve 76 are mechanically interconnected, which connection is illustrated by the dotted line 86 in FIGS. 1–4. As will be clear from the further description, the fluid pressure circuit includes a pump P, an accumulator ACC and an accumulator valve 88. This valve is spring loaded at 90 to a position shifted upwardly from that shown in the drawings, it being understood that when the accumulator is charged the hydraulic effect on the valve 88 is to cause it to assume the position illustrated.

The details of the selector valve means 70 are best shown in FIGS. 5 and 6. This means may include a valve housing 92 having therein a pair of parallel cylindrical bores 94 and 96. The bore 94 carries the selector valve 72 for axial shifting among the six positions illustrated and labeled as R, $N_2$, $H_2$, $H_1$, $N_1$ and L. The housing is provided with inlet means shown at 98 in FIGS. 1–4 and comprising a pump inlet 100 and an accumulator inlet 102, which lead to the selector valve bore 94 in parallel, except that the pump inlet 100 is controlled by the metering valve 74 whereas the accumulator inlet 102 is always open to the bore 94. The bore 94 is connected to the clutches HC and L/RC—which may be regarded as hydraulic motors, since they are hydraulically operated—by clutch lines HCL and L/RCL, and for this purpose the selector valve housing 92 has a plurality of motor ports 104, 106 and 108. The port 106 is connected directly to the line HCL and the two ports 104 and 108 are interconnected as indicated and lead in common to the line L/RCL. In addition, the housing 92 has a drain or reservoir port 110.

The upper side of the selector valve 72 has therein an elongated groove 112 of sufficient length as to maintain communication with the accumulator inlet 102 regardless of the axial position of the selector valve. The selector valve is axially bored at 114, and this bore is plugged at one end at 116 and is open at its other end to afford a controllable port 118. This port is open to the drain or reservoir port 110 and is controlled by a throttling or bleed control pin 120 which is carried by a plug 122 that closes one end of the selector valve bore 94. The pin 120 has a main cylindrical body 124, an annular groove 126 and a head 128. The body 124 and head 128 are diametrically proportioned relative to the selector valve axial port 118 so that when either the head or body is in radial register with the port 118, fluid flow through the port 118 to the drain port 110 is throttled or restricted, whereas radial register between the port 118 and the groove 126 provides relatively rapid flow to the drain port 110. As shown in FIG. 5, the selector valve is in a position in which the port 118 is clear of the pin 120 and fluid flow returning from the high-range clutch line HCL via the port 106 and a radial port 130 in the selector valve may exit through the end portion 118 at a relatively rapid rate. The port 130 of course communicates with the axial bore 114 in the selector valve. FIG. 6 shows a relationship in which the bleed or throttling effect is established between 118 and 124, and in this case return from the line HCL and port 106 through a second return port 132 in the valve 72 must bleed past the control pin body 124. The position occupied by the selector valve 72 in FIG. 6 (its L position) is one of two in which the bleed or throttling effect is achieved. The other of the positions will be the $H_1$ position, in which case the port 118 will be in radial register with the control pin head 128. The purpose of the bleed or throttling effect in these two positions is to restrict the return flow from the clutch being disengaged, which is desirable since in the phase or range just referred to the system is operating in its forward-forward range and it is therefore desirable to pick up the load by one clutch before dropping it completely from the other. Thus, the forward-forward range of the selector valve 72 is represented by the shift among $H_1$, $N_1$ and L. The forward-reverse range is represented by movement of the valve 72 among R, $N_2$ and $H_2$. In this regard, it should be noted that the two positions $H_1$ and $H_2$ are substantially identical except that the throttling effect at 118—128 is effective in the $H_1$ position but not in the $H_2$ position.

The selector valve 72 has therein, intermediate the return ports 130 and 132, a pressure groove 134 which is structurally separate from the selector valve bore 114. This groove is selectively registrable with the ports 104, 106 and 108. Since the ports 104 and 108 are interconnected (FIGS. 5 and 6), the same result as to clutch pressurization is obtained in each instance, except that the difference between the two positions is established by an interconnection (not shown) between the selector valve 72 and the means (not shown) for shifting the forward-reverse collar 54. For example, when the groove 134 is alined with the port 104, to produce low speed forward, as shown in FIG. 6, the forward-reverse collar 54 is in its forward or low position as shown in FIG. 1. Similarly, when the selector valve 72 is in its reverse position as shown in FIG. 5, the interconnecting means just referred to incur shifting of the forward-reverse collar 54 to its reverse position, as indicated by the legend in FIG. 1. The foregoing is an attribute of the mechanical aspects of the design which enables the use of two clutches (here HC and L/RC) as distinguished from more than two. In other words, the clutch L/RC doubles as a forward clutch in the forward-forward or low-high range and also as a reverse clutch in the forward-reverse range, but in both ranges it is of course alternately engageable and disengageable as fluid pressure is alternated between the two clutches. One other difference, already discussed, exists as between the FIG. 5 and FIG. 6 positions. In FIG. 5, the throttling effect at 120—118 is not employed and the high-range clutch line HCL is connected to reservoir via 130—118—110. In FIG. 6, the throttling effect is exploited and the exhausting of the clutch HC occurs via HCL—106—132—118/124—110. In other words, as explained above, in the forward-forward range (high-low) the disengagement of the clutch being disconnected is slightly retarded but in the forward-reverse range there is no retarding effect.

From the description thus far, it will be seen that the selector valve 72 is selectively positionable among six positions for connecting the inlet means 98 (pump inlet 100 and accumulator inlet 102) to the motor lines HCL and L/RCL, it being clear that when one of these lines is pressurized the other is returned to reservoir at 110. Considered in this respect, it will be seen that the system utilizes both pump and accumulator fluid for pressurizing the selected one of the clutches HCL and L/RCL. However, it is desired to modify the effect of the pressure source on the clutch control and for that reason the metering valve 74 is used. This valve comprises a metering valve piston 136 axially slidably carried in the metering valve bore 96, the forward or right hand end of which affords a chamber 138 which has an outlet 140 controlled by the regulating or metering valve dump valve 76. In the preferred embodiment disclosed, the outlet 140 is perpendicular to a counterbore 142 coaxial with the open end of the selector valve bore 94. This counterbore is connected to reservoir as at 144. A dump valve piston 146 is slidable in the vertical passage afforded by the metering valve chamber outlet 140, and the vertical position of the piston 146 determines whether the outlet 140 is closed, restricted or fully oepned, and this in turn depends upon actuating means connected between the selector valve 72 and the metering valve dump valve. In this instance, the actuating means is provided by a cam portion 148 on the right hand end of the selector valve 72 and a cam follower portion 150 on the lower end of the dump valve piston 146. As will be apparent from FIGS. 5 and 6, those portions of the cam 148 that represent the reverse, H₂, H₁ and low positions are at the same level, and in all these instances the dump valve 146 closes the outlet 140, because grooves 152 (FIG. 7) are disconnected from a passage 154 which is provided as an extension of the metering valve chamber 138 and which leads to the controllable outlet 140.

As will also be noted, the cam portion includes two high areas corresponding to the N₁ and N₂ positions. The area at N₁ is at a level lower than the area at N₂, and this difference in height of course determines the amount to which the dump valve piston 146 will be elevated. For example, in the N₁ position, raising of the piston 146 will be sufficient to connect the grooves 152 to the passage 154 in a manner permitting a restricted flow of fluid through the outlet 140 to the reservoir 144 via the counterbore 142; but, in the N₂ position, the elevation will be such as to fully connect the grooves 152 to the chamber 138 via the passage 154, whereby the rate of fluid flow will be materially higher. Thus, the selector valve, acting through the metering valve dump valve piston 146, determines the rates at which fluid is capable of being exhausted from the chamber 138 ahead of the metering valve piston 136. This piston is spring loaded to the FIG. 5 position by a coiled compression spring 156 which operates between the left hand end of the piston 136 and a plug 158 in the left hand end of the metering valve bore 96. The plug incorporates a stop 160 which limits leftward movement of the piston 136 to the position shown in FIG. 6.

The nature of the piston 136 is such that it controls the rate of fluid flow from the pump inlet 100 to the pressure groove 112–134 in the selector valve 72, and this regulation is controlled by the piston 136 because of the provision on the piston of relatively narrow longitudinal grooves 162 which, in the FIG. 5 position of the piston 136, establish orifice means in the pump line 100. This is illustrated in the schematic views by the numeral 162, to represent the grooves in the piston 136. It will be noted that the accumulator inlet 102 is downstream of the restriction or orifice means 162.

When the piston 136 is in its FIG. 6 position, the orifice meanes is nullified and the pump line 100 is opened for fluid flow at its full rate to the groove 112–134 in parallel with the accumulator inlet 102. In a broad sense, the pump inlet 100 may be regarded as a pump line, and the accumulator inlet 102 may be regarded as an accumulator line, since the components need not in all cases be cored or drilled in a valve housing as illustrated; although, in the specific sense noted, there is novelty in the compact arrangement.

The position of the piston 136 depends upon fluid pressure in the chamber 138 and this in turn depends upon the regulating control applied to the chamber outlet 140 via the metering valve dump valve 76. The admission of fluid to the metering valve chamber 138 is accomplished by orifice means designated in its entirety by the numeral 164 and established in the piston by means of a radial orifice 166 drilled in the piston in the area of an annular groove 168 and communicating with an axial bore 170 in the piston, which bore is controlled as to size by a pair of orifice plugs 172. The passages in the plugs 172 are of course in series with the radial orifice 166, which is a preferred method of accomplishing the orifice means 164. This means may be calibrated in design and assembly to accomplish the admission of fluid pressure to the chamber 138 at the rate desired for proper operation of the valve system. The orifice grooves 162 in the outer surface of the piston 136 communicate with the annular groove 168 so that fluid pressure in the pump inlet 100 is communicated to the groove 168 and hence to the orifice means 164, which is best explained by noting FIG. 5. In the FIG. 6 position of the piston, the radial orifice 166 is of course in communication with the pump inlet 100 via the annular groove 168.

As best shown in FIG. 1, the discharge side of the pump P is connected to one side of the accumulator valve 88 via a line 174, and another pump line 176 is connected to one side of the control valve 78. An accumulator supply line 178 connects the accumulator to the same side of the valve 78 and, in the No. 1 position of this valve, the pressure line 176 is connected to the pump line 100 and the accumulator supply line 178 is connected to the accumulator line 102. FIG. 1 illustrates a condition in which the accumulator is charged and therefore the accumulator valve 88 is in the position shown, meaning that the accumulator will continue to be charged by the pump at a rate determined by the position of the metering valve 74. And the position of the metering valve is determined by the position of the selector valve because of the actuating means or mechanical connection 86 (cam portion 148 and cam follower 150 on the dump valve piston 146).

When the accumulator is fully discharged, the valve 88 will shift to a position above that shown in FIG. 1, for example, in which case the valve will connect the pump discharge line 174 directly to the accumulator supply line 178, thereby charging the accumulator without requiring pump pressure to travel through the metering valve 74. This latter aspect may best be understood by looking at FIG. 1 and noting that the pump line 100 goes through the metering valve 74 and ends at the inlet means 98 of the selector valve 72 which, being in neutral, blocks the accumulator line 102 at the selector valve bore 94. However, the accumulator line remains connected across the control valve 78 in its No. 1 position so that the line 102—178 supplies the accumulator. When the selector valve 72 is in its neutral position, both clutches HC and L/RC are dumped to reservoir. In addition, these clutches may include any type of centrifugally controlled dump valves, but these are not material to the present invention and are mentioned only to indicate that a wide variety of hydraulically controlled clutches may be tied into the present system.

In the immediately following description, it will be assumed that the position of the control valve 78 will remain as shown in FIG. 1, to which position it is spring loaded by the spring 82, already described. This will be representative of normal operating conditions in which the clutch pedal, for example, will be in its elevated position. Accordingly, engagement and disengagement of the clutches HC and L/RC will be controlled entirely by the selector valve 72 which, as already described, is designed so that it alternately engages the clutches, with the further characteristic that disengagement of the released clutch in the forward-forward range is retarded by the orifice means 118—124 and 118—128. The control valve 78 is provided for several reasons, among which are to make available a quick release of pressure to the clutches in case of emergency and also to provide a manual control for "inching" and similar operations, in which case it may be manually shifted among its Nos. 1, 2, and 3 positions, giving the operator a more precise control over the clutches. This, in conjunction with the fact that the valve 78 is hydraulically modulated (as indicated by the rectangles labeled HYD), provides a commercially successful system.

As already stated, with the control valve 78 in its No. 1 position, control of the clutches HC and L/RC is accomplished by the selector valve 72. The $N_1$ position is shown in FIG. 1 and has already been described. So far as effect on the clutches is concerned, the $N_2$ position accomplishes the same result, it being clear from the schematic views that the selector valve 72 in the areas labeled $N_1$ and $N_2$ are identical. However, there will be a difference in the effect of the selector valve position on the metering valve dump valve 76, and this in turn will determine the rate at which the clutches will be engaged. Stated briefly, in the forward-forward (low-high) range, engagement of the clutches is effected relatively rapidly, since the need for a cushioned engagement in either instance is relatively slight. In forward-reverse range, relatively slower engagement is desired because of the change in vehicular direction.

Consonant with the above is the regulatory effect on the metering valve 74 by the metering valve dump valve 76. This will become clear from an examination of FIGS. 5 and 6, the former of which shows the selector valve in its R position, which is one end of the forward-reverse range, the other end being the $H_2$ position. It should first be assumed that before being moved to the R position of FIG. 5, the selector valve 72 occupied the $N_2$ position, thus corresponding with the schematic illustration in FIG. 3. Also, it should be remembered that when the selector valve is moved to its R position, the forward-reverse collar 54 (FIG. 1) is moved to connect the driving member 52 and reverse pinion 48. While the selector valve 72 occupied its $N_2$ position, it held the metering valve dump valve 76 fully open so that the metering valve chamber 138 was drained to reservoir. Consequently, the metering valve piston 136 moved to the position of FIG. 5 under action of its spring 156. The accumulator, charged as described above, while the selector valve 72 was in its $N_2$ position, will be connected to the clutch L/RC when the selector valve 72 is moved to its R position, and the accumulator flow will fill this clutch to take up all slack and lost motion, applying thereto only the pressure that is in the accumulator. Since the metering valve piston 136 is in the FIG. 5 position, the orifice 162 becomes effective and pump pressure to the clutch L/RC is restricted. Since this restriction is upstream of the accumulator line 102, charging of the accumulator line 102 from the pump line 100 is at a restricted rate, since pump line pressure must flow through the orifice 162 before it reaches the accumulator line 102. Consequently, engagement of the clutch L/RC is cushioned until pump pressure builds up, during which time the metering valve chamber 138 is filling via the orifice 164 until the metering valve piston 136 shifts to the position corresponding to that in FIG. 6.

Now, when the operator desires to change direction, at which time the vehicle will remain in the forward-reverse range, he shifts the selector valve to the $H_2$ position. In doing so, the selector valve must pass through the $N_2$ position, at which point the cam 148 has its highest area. This fully opens the metering valve dump valve piston 146 and dumps the chamber 138 to reservoir via 154—140—142—144, whereupon the metering valve piston 136 returns to a position corresponding to that shown in FIG. 5, and the same results as to accumulator charging and application of pressure to the clutch HC is obtained as before. Thus, clutch engagement at each end of the forward-reverse range is cushioned, regardless of which clutch is being pressurized.

Figure 3:
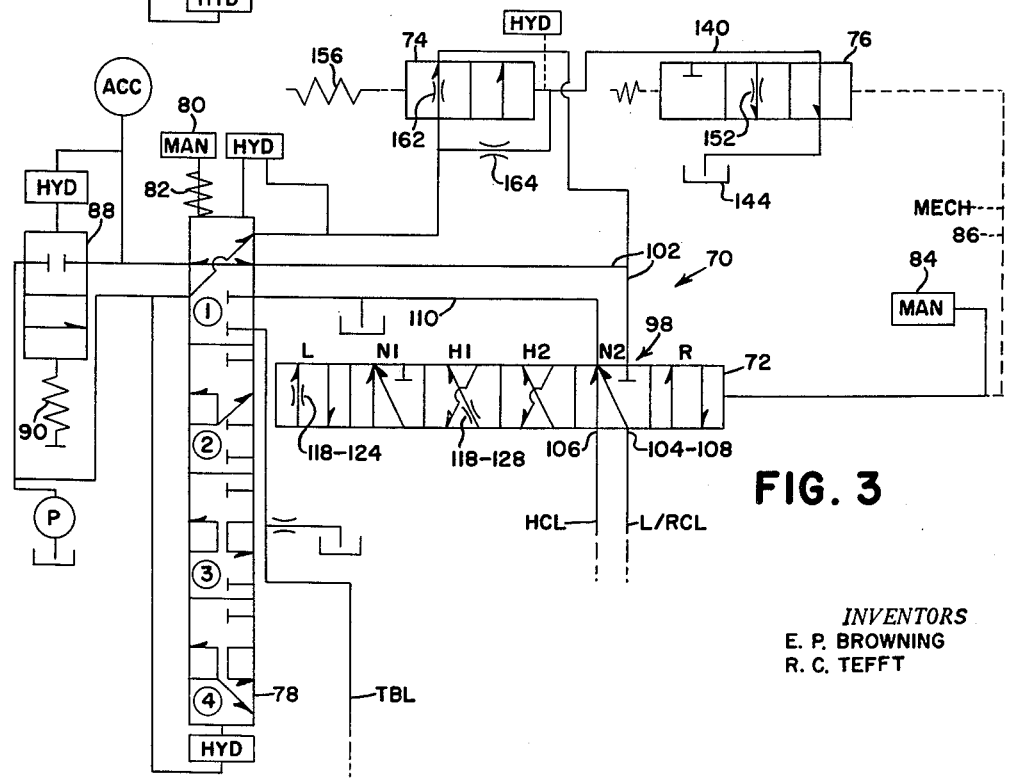
FIG. 3 is a similar schematic view but showing the selector valve in a still another position.

As previously described, the relatively slow or cushioned engagement is not required in operation of the system in the forward-forward or high-low range, in shifting between $H_1$ and L or vice versa. The neutral position $N_1$ intervenes between the $H_1$ and L positions, but the cam 148 in the area of the $N_1$ position is substantially lower than the cam portion in the $N_2$ area, with the result that the metering valve dump valve piston 146 is not fully opened, in which case the partially opened status of the dump valve establishes the orifice 152. The difference between the effect of the dump valve in the forward-reverse range and the forward-forward range is best illustrated by a comparison of FIGS. 1, 2 and 3. FIG. 1 shows the $N_1$ position, which is the intermediate position in the forward-forward or high-low range. The schematic portion of the view shows that the orifice 152 is effective, but when the selector valve 72 is shifted to the $H_1$ position (FIG. 2) the metering valve dump valve 76 closes, and the chamber 138 fills so that the metering valve 74 is shifted to the left against the spring loading at 156, whereupon the orifice 162 is by-passed and fluid flow through the selector valve is at a relatively rapid rate. In other words, the metering valve piston 136 occupies the same position as it does in FIG. 6. FIG. 3 shows that the selector valve 72 in its $N_2$ position conditions the metering valve dump valve 76 to fully exhaust the metering valve chamber 138, allowing the metering valve 74 to shift to the position in which the orifice 162 is effective, thus conditioning the metering valve to restrict the pump line when the selector valve is shifted to either the $H_2$ position or the R position.

Although the operator may normally exploit the difference in rates of clutch engagement between the forward-forward and forward-reverse ranges, there may be times when he would prefer slow engagement in the forward-forward range. This he may readily accomplish by decreasing the speed with which he moves the selector valve through the $N_1$ phase. That is, if he moves the selector valve to the $N_1$ position and holds it there long enough for the metering valve chamber 138 to drain through the orifice 152, he will incur the restricted position of the metering valve; that is, the position in which the orifice means 162 is effective. This is another characteristic of the invention which affords increased flexibility of operation.

In those instances in which the control valve 78 is manipulated for "inching" and emergency operation, the metering valve is by-passed, an example of which is shown in FIG. 4 wherein the control valve 78 is illustrated in its No. 2 position. Here, it will be seen that the pressure line 176 is connected via the No. 2 position of the valve 78 directly to the accumulator line 178 as well as to the accumulator line 102. This in effect removes the accumulator from the circuit and enables charging of the selected clutch directly from the pump, creating a greater condition of "feel" and substantially simulating the mechanical actuation of a clutch. In other words, inching is accomplished by shifting the control valve 78 back and forth between its Nos. 2 and 3 positions. In the case of an emergency, the control valve 78 may be shifted fully to its No. 4 position which distinguishes from the No. 3 position in that in addition to dumping both clutches to reservoir, it also connects the pressure line 176 to the transmission brake line TBL. In this phase of operation, the operator may effect speed and range changes in the transmission that he may not be able to accomplish solely with the use of the selector valve 72, because of certain operating conditions as in down-shifting in adverse circumstances. In each of the Nos. 2, 3 and 4 positions, the discharge side of the pump is connected via 176 to the accumulator supply line 178 through the valve 78 and the metering valve 74 is by-passed. In the No. 3 position, as already indicated, both clutches are dumped to reservoir. In the No. 4 position, both clutches are dumped to reservoir and in addition the transmission brake is pressurized.

It will be readily seen from the foregoing that a relatively simple control system has been provided for a relatively complex control arrangement. The design of the valve is such that it is quite compact and relatively short, considering that it has six positions. The control of the pump line relative to the clutches and accumulator is significant in affording the two rates of clutch engagement. In addition, the control valve 78 may be used to remove the accumulator effect from the circuit.

Features and advantages other than those enumerated will readily occur to those versed in the art, as will many modifications and alterations in the preferred embodiment disclosed, all of which may be achieved without departure from the spirit and scope of the invention.

What is claimed is:

1. A hydraulic control system, comprising: a pump; an accumulator; a pair of alternately pressurizible motors; selector valve means including a housing having inlet means, a pair of motor ports connected respectively to the motors, a drain port, and a selector valve shiftable in a first range including first and second active positions flanking a first neutral position and in a sequentially related second range including third and fourth active positions flanking a second neutral position, said selector valve in any active position connecting the motor ports alternately to the inlet means and to the drain port and in both neutral positions disconnecting the motor ports from the inlet means and connecting them to the drain port; an accumulator line connecting the accumulator to the inlet means; a pump line connecting the pump to the inlet means; a metering valve in the pump line upstream of the connection of the accumulator line to the inlet means and operative in a first condition to restrict fluid flow through the pump line and in a second condition to provide for relatively free flow through said pump line; means biasing the metering valve to its first condition; hydraulic means responsive to pump line pressure upstream of the metering valve and acting on the metering valve to incur the second condition thereof, said hydraulic means including a fluid-pressure-receivable chamber having an outlet; a regulating valve biased to a closed position for closing the outlet so as to capacitate said hydraulic means to incur said second condition of the metering valve when the pump line is pressurized, and said regulating valve being movable to a bleed position and to a dump position relative to said outlet to provide respectively slow and fast escape of fluid from the chamber and thus to regulate the rate of biased return of the metering valve to its first condition; and actuating means operative between the selector valve and the regulating valve for incurring the closed, bleed and dump positions of the regulating valve respectively according to the active, first neutral and second neutral positions of the selector valve.

2. The invention defined in claim 1, including: restrictor valve means connected to the selector valve and operative in at least one of said active positions to retard the rate of fluid flow from a motor through the drain port.

3. A hydraulic control system, comprising: a pressure source; a pair of alternately pressurizible motors; selector valve means including a housing having inlet means, a pair of motor ports connected respectively to the motors, a drain port, and a selector valve shiftable in a first range including first and second active positions flanking a first neutral position and in a sequentially related second range including third and fourth active positions flanking a second neutral position, said selector valve in any active position connecting the motor ports alternately to the inlet means and to the drain port and in both neutral positions disconnecting the motor ports from the inlet means and connecting them to the drain port; a pressure line connecting the source to the inlet means; a metering valve in the pressure line upstream of the inlet means and operative in a first condition to restrict fluid flow through the pressure line and in a second condition to provide for relatively free flow through said pressure line; means biasing the metering valve to its first condition; hydraulic means responsive to pressure line pressure upstream of the metering valve and acting on the metering valve to incur the second condition thereof, said hydraulic means including a fluid-pressure-receivable chamber having an outlet; a regulating valve biased to a closed position for closing the outlet so as to capacitate said hydraulic means to incur said second condition of the metering valve when the pressure line is pressurized, and said regulating valve being movable to a bleed position and to a dump position relative to said outlet to provide respectively slow and fast escape of fluid from the chamber and thus to regulate the rate of biased return of the metering valve to its first condition; and actuating means operative between the selector valve and the regulating valve for incurring the closed, bleed and dump positions of the regulating valve respectively according to the active, first neutral and second neutral positions of the selector valve.

4. A hydraulic control system, comprising: a pump; an accumulator; a pair of alternately pressurizible motors; selector valve means including a housing having inlet means, a pair of motor ports connected respectively to the motors, a drain port, and a selector valve shiftable in a first range including first and second active positions flanking a first neutral position and in a sequentially related second range including third and fourth active positions flanking a second neutral position, said selector valve in any active position connecting the motor ports alternately to the inlet means and to the drain port and in both neutral positions disconnecting the motor ports from the inlet means and connecting them to the drain port; an accumulator line connecting the accumulator to the inlet means; a pump line connecting the pump to the inlet means; a metering valve in the pump line upstream of the connection of the accumulator line to the inlet means and operative in a first condition to restrict fluid flow through the pump line and in a second condition to provide for relatively free flow through said pump line; means biasing the metering valve to its first condition; hydraulic means responsive to pump line pressure upstream of the metering valve and acting on the metering valve to incur the second condition thereof, said hydraulic means including a fluid-pressure-receivable chamber having an outlet; and means operative between the selector valve and the metering valve for closing, partly opening and more widely opening said outlet respectively according to the active, first neutral and second neutral positions of the selector valve.

5. A hydraulic control system, comprising: a pressure source; a pair of alternately pressurizible motors; selector valve means including a housing having inlet means, a pair of motor ports connected respectively to the motors, a drain port, and a selector valve shiftable in a first range including first and second active positions flanking a first neutral position and in a sequentially related second range including third and fourth active positions flanking a second neutral position, said selector valve in any active position connecting the motor ports alternately to the inlet means and to the drain port and in both neutral positions disconnecting the motor ports from the inlet means and connecting them to the drain port; a pressure line connecting the source to the inlet means; a metering valve in the pressure line upstream of the inlet means and operative in a first condition to restrict fluid flow through the pressure line and in a second condition to provide for relatively free flow through said pressure line; means biasing the metering valve to its first condition; hydraulic means responsive to pressure line pressure upstream of the metering valve and acting on the metering valve to incur the second condition thereof, said hydraulic means including a fluid-pressure-receivable chamber having an outlet; and means operative between the selector valve and the metering valve for closing, partly opening and more widely opening said outlet respectively according to the active, first neutral and second neutral positions of the selector valve.

6. A hydraulic control system, comprising: a pump; an accumulator; a pair of alternately pressurizible motors; selector valve means including a housing having inlet means, a pair of motor ports connected respectively to the motors, a drain port, and a selector valve shiftable in a first range including first and second active positions flanking a first neutral position and in a sequentially related second range including third and fourth active positions flanking a second neutral position, said selector valve in any active position connecting the motor ports alternately to the inlet means and to the drain port and in both neutral positions disconnecting the motor ports from the inlet means and connecting them to the drain port; an accumulator line connecting the accumulator to the inlet means; a pump line connecting the pump to the inlet means; a metering valve in the pump line upstream of the connection of the accumulator line to the inlet means and operative in a first condition to restrict fluid flow through the pump line and in a second condition to provide for relatively free flow through said pump line; means biasing the metering valve to its first condition; hydraulic means responsive to pump line pressure upstream of the metering valve and acting on the metering valve to incur the second condition thereof, said hydraulic means including a fluid-pressure-receivable chamber; and means operative between the selector valve and the metering valve for closing said chamber against the escape of fluid therefrom, for bleeding fluid from said chamber and for dumping fluid from said chamber respectively according to the active, first neutral and second neutral positions of the selector valve.

7. A hydraulic control system, comprising: a pressure source; a pair of alternately pressurizible motors; selector valve means including a housing having inlet means, a pair of motor ports connected respectively to the motors, a drain port, and a selector valve shiftable in a first range including first and second active positions flanking a first neutral position and in a sequentially related second range including third and fourth active positions flanking a second neutral position, said selector valve in any active position connecting the motor ports alternately to the inlet means and to the drain port and in both neutral positions disconnecting the motor ports from the inlet means and connecting them to the drain port; a pressure line connecting the source to the inlet means; a metering valve in the pressure line upstream of the inlet means and operative in a first condition to restrict fluid flow through the pressure line and in a second condition to provide for relatively free flow through said pressure line; means biasing the metering valve to its first condition; hydraulic means responsive to pressure line pressure upstream of the metering valve and acting on the metering valve to incur the second condition thereof, said hydraulic means including a fluid-pressure-receivable chamber; and means operative between the selector valve and the metering valve for closing said chamber against the escape of fluid therefrom, for bleeding fluid from said chamber and for dumping fluid from said chamber respectively according to the active, first neutral and second neutral positions of the selector valve.

8. A hydraulic control system, comprising: a pump; an accumulator; a pair of alternately pressurizible motors; selector valve means including a housing having inlet means, a pair of motor ports connected respectively to the motors, a drain port, and a selector valve shiftable among a plurality of positions arranged sequentially as first active, first neutral, second active, second neutral, and third active, said selector valve in any active position connecting the motor ports alternately to the inlet means and to the drain port and in both neutral positions disconnecting the motor ports from the inlet means and connecting them to the drain port; an accumulator line connecting the accumulator to the inlet means; a pump line connecting the pump to the inlet means; a metering valve in the pump line upstream of the connection of the accumulator line to the inlet means and operative in a first condition to restrict fluid flow through the pump line and in a second condition to provide for relatively free flow through said pump line; means biasing the metering valve to its first condition; hydraulic means responsive to pump line pressure upstream of the metering valve and acting on the metering valve to incur the second condition thereof, said hydraulic means including a fluid-pressure-receivable chamber having an outlet; a regulating valve biased to a closed position for closing the outlet so as to capacitate said hydraulic means to incur said second condition of the metering valve when the pump line is pressurized, and said regulating valve being movable to a bleed position and to a dump position relative to said outlet to provide respectively slow and fast escape of fluid from the chamber and thus to regulate the rate of biased return of the metering valve to its first condition; and actuating means operative between the selector valve and the regulating valve for incurring the closed, bleed and dump positions of the regulating valve respectively according to the active, first neutral and second neutral positions of the selector valve.

9. A hydraulic control system, comprising: a pressure source; a pair of alternately pressurizible motors; selector valve means including a housing having inlet means, a pair of motor ports connected respectively to the motors, a drain port, and a selector valve shiftable among a plurality of positions arranged sequentially as first active, first neutral, second active, second neutral, and third active, said selector valve in any active position connecting the motor ports alternately to the inlet means and to the drain port and in both neutral positions disconnecting the motor ports from the inlet means and connecting them to the drain port; a pressure line connecting the source to the inlet means; a metering valve in the pressure line upstream of the inlet means and operative in a first condition to restrict fluid flow through the pressure line and in a second condition to provide for relatively free flow through said pressure line; means biasing the metering valve to its first condition; hydraulic means responsive to pressure line pressure upstream of the metering valve and acting on the metering valve to incur the second condition thereof, said hydraulic means including a fluid-pressure-receivable chamber having an outlet; a regulating valve biased to a closed position for closing the outlet so as to capacitate said hydraulic means to incur said second condition of the metering valve when the pressure line is pressurized, and said regulating valve being movable to a bleed position and to a dump position relative to said outlet to provide respectively slow and fast escape of fluid from the chamber and thus to regulate the rate of biased return of the metering valve to its first condition; and actuating means operative between the selector valve and the regulating valve for incurring the closed, bleed and dump positions of the regulating valve respectively according to the active, first neutral and second neutral positions of the selector valve.

10. A hydraulic control system, comprising: a pressure source; a pair of alternately pressurizible motors; selector valve means including a housing having inlet means, a pair of motor ports connected respectively to the motors, a drain port, and a selector valve shiftable among a plurality of positions arranged sequentially as first active, first neutral, second active, second neutral, and third active, said selector valve in any active position connecting the motor ports alternately to the inlet means and to the drain port and in both neutral positions disconnecting the motor ports from the inlet means and connecting them to the drain port; a pressure line connecting the source to the inlet means; a metering valve in the pressure line upstream of the inlet means and operative in a first condition to restrict fluid flow through the pressure line and in a second condition to provide for relatively free flow through said pressure line; means biasing the metering valve to its first condition; hydraulic means responsive to pressure line pressure upstream of the metering valve and acting on the metering valve to incure the second condition thereof, said hydraulic means including a fluid-pressure-receivable chamber having an outlet; and means operative between the selector valve and the metering valve for closing, partly opening and more widely opening said outlet respectively according to the active, first neutral and second neutral positions of the selector valve.

11. A hydraulic control system, comprising: a pressure source; a pair of alternately pressurizible motors; selector valve means including a housing having inlet means, a pair of motor ports connected respectively to the motors, a drain port, and a selector valve shiftable among a plurality of positions arranged sequentially as first active, first neutral, second active, second neutral, and third active, said selector valve in any active position connecting the motor ports alternately to the inlet means and to the drain port and in both neutral positions disconnecting the motor ports from the inlet means and connecting them to the drain port; a pressure line connecting the source to the inlet means; a metering valve in the pressure line upstream of the inlet means and operative in a first condition to restrict fluid flow through the pressure line and in a second condition to provide for relatively free flow through said pressure line; means biasing the metering valve to its first condition; hydraulic means responsive to pressure line pressure upstream of the metering valve and acting on the metering valve to incur the second condition thereof, said hydraulic means including a fluid-pressure-receivable chamber; and means operative between the selector valve and the metering valve for closing said chamber against the escape of fluid therefrom, for bleeding fluid from said chamber and for dumping fluid from said chamber respectively according to the active, first neutral and second neutral positions of the selector valve.

12. A fluid pressure system, comprising: a pump; an accumulator; motor means; and control means selectively operative in a neutral condition and in first and second active conditions, said control means including a charging connection effective in said neutral condition to connect the accumulator to the pump exclusively of the motor means, and including passage means effective in said first active condition to connect the pump and accumulator in parallel to the motor means, and said control means including, effective in said second active condition, a first fluid connection from the accumulator to the motor means and a second fluid connection from the pump to both the accumulator and motor means, said second connection having a fluid-flow restriction therein of greater restrictive effect than either said passage means or said first connection whereby in said second condition pump flow to the accumulator and motor means is restricted.

13. A hydraulic control system, comprising: a pump; an accumulator; a pair of alternately pressurizible motors; selector valve means including a housing having inlet means, a pair of motor ports connected respectively to the motors, a drain port, and a selector valve shiftable from a central position and in one direction to a first offset position and in the opposite direction to a second offset position, said valve in any of said positions serving to connect the motor ports alternately to the inlet means and to the drain port; an accumulator line connecting the accumulator to the inlet means; a pump line connecting the pump to the inlet means; a metering valve in the pump line upstream of the connection of the accumulator line to the inlet means and operative in a first condition to restrict fluid flow through the pump line and in a second condition to provide for relatively free flow through said pump line; means biasing the metering valve to its first condition; hydraulic means responsive to pump line pressure upstream of the metering valve and acting on the metering valve to incur the second condition thereof, said hydraulic means including a fluid-pressure-receivable chamber having an outlet; a regulating valve biased to a closed position for closing the outlet so as to capacitate said hydraulic means to incur said second condition of the metering valve when the pump line is pressurized, and said regulating valve being movable to a bleed position and to a dump position relative to said outlet to provide respectively slow and fast escape of fluid from the chamber and thus to regulate the rate of biased return of the metering valve to its first condition; and actuating means operative between the selector valve and the regulating valve for incurring the closed position of the regulating valve in any of said selector positions, and said actuating means being operative to incur said bleed and dump conditions respectively according to positioning of the selector valve between said central and first offset positions and between said central and second offset position.

14. A hydraulic control system, comprising: a pressure source; a pair of alternately pressurizible motors; selector valve means including a housing having inlet means, a pair of motor ports connected respectively to the motors, a drain port, and a selector valve shiftable from a central position and in one direction to a first offset position and in the opposite direction to a second offset position, said valve in any of said positions serving to connect the motor ports alternately to the inlet means and to the drain port; a pressure line connecting the source to the inlet means; a metering valve in the pressure line upstream of the inlet means and operative in a first condition to restrict fluid flow through the pressure line and in a second condition to provide for relatively free flow through said pressure line; means biasing the metering valve to its first condition; hydraulic means responsive to pressure line pressure upstream of the metering valve and acting on the metering valve to incur the second condition thereof, said hydraulic means including a fluid-pressure-receivable chamber having an outlet; a regulating valve biased to a closed position for closing the outlet so as to capacitate said hydraulic means to incur said second condition of the metering valve when the pressure line is pressurized, and said regulating valve being movable to a bleed position and to a dump position relative to said outlet to provide respectively slow and fast escape of fluid from the chamber and thus to regulate the rate of biased return of the metering valve to its first condition; and actuating means operative between the selector valve and the regulating valve for incurring the closed position of the regulating valve in any of said selector positions, and said actuating means being operative to incur said bleed and dump conditions respectively according to positioning of the selector valve between said central and first offset positions and between said central and second offset position.

15. A hydraulic control system, comprising: a pump; an accumulator; a pair of alternately pressurizible motors; selector valve means including a housing having inlet means, a pair of motor ports connected respectively to the motors, a drain port, and a selector valve shiftable from a central position and in one direction to a first offset position and in the opposite direction to a second offset position, said valve in any of said positions serving to connect the motor ports alternately to the inlet means and to the drain port; an accumulator line connecting the accumulator to the inlet means; a pump line connecting the pump to the inlet means; a metering valve in the pump line upstream of the connection of the accumulator line to the inlet means and operative in a first condition to restrict fluid flow through the pump line and in a second condition to provide for relatively free flow through said pump line; means biasing the metering valve to its first condition; hydraulic means responsive to pump line pressure upstream of the metering valve and acting on the metering valve to incur the second condition thereof, said hydraulic means including a fluid-pressure-receivable chamber; and actuating means operative between the selector valve and the metering valve for closing said chamber against the escape of fluid in any of said selector valve positions, said actuating means being operative when the selector valve is intermediate said central and first offset positions to bleed fluid from said chamber and operative when said selector valve is intermediate said central and second offset positions to dump fluid from said chamber.

16. A hydraulic control system, comprising: a pressure source; a pair of alternately pressurizible motors; selector valve means including a housing having inlet means, a pair of motor ports connected respectively to the motors, a drain port, and a selector valve shiftable from a central position and in one direction to a first offset position and in the opposite direction to a second offset position, said valve in any of said positions serving to connect the motor ports alternately to the inlet means and to the drain port; a pressure line connecting the source to the inlet means; a metering valve in the pressure line upstream of the inlet means and operative in a first condition to restrict fluid flow through the pressure line and in a second condition to provide for relatively free flow through said pressure line; means biasing the metering valve to its first condition; hydraulic means responsive to pressure line pressure upstream of the metering valve and acting on the metering valve to incur the second condition thereof, said hydraulic means including a fluid-pressure-receivable chamber; and actuating means operative between the selector valve and the metering valve for closing said chamber against the escape of fluid in any of said selector valve positions, said actuating means being operative when the selector valve is intermediate said central and first offset positions to bleed fluid from said chamber and operative when said selector valve is intermediate said central and second offset positions to dump fluid from said chamber.

17. A hydraulic control system, comprising: a pump; an accumulator; motor means; selector valve means including inlet means, drain means, motor line means leading to the motor means, and a selector valve positionable in either of two active positions connecting the inlet means to the motor line means and in a neutral position intermediate said active positions and connecting the motor line means to the drain means; a pump line connecting the pump to the inlet means; an accumulator line connecting the accumulator to the inlet means; metering valve means controlling the pump line upstream of the connection of the accumulator line to the inlet means and operative selectively in first and second conditions to respectively provide slow and fast rates of fluid flow through the pump line; and actuating means operative in response to positioning of the selector valve to incur the first and second conditions of the metering valve means respectively according to the neutral and either active position of the selector valve.

18. The invention defined in claim 17, including: control valve means operative on the pump and accumulator lines upstream of the metering valve and operative in a first status to route the pump and accumulator lines as aforesaid and in a second status connecting the pump line directly to the accumulator line in by-passing relation to the metering valve means; and means for changing the status of said control valve.

19. A control valve, comprising: a housing having a selector valve bore including a pressure port, a drain port and a plurality of motor ports, said housing further having a metering valve bore opening to the selector valve bore via the pressure port and including an inlet passage, and one end of said metering valve bore providing a fluid-pressure-receivable chamber; a selector valve movable back and forth in the selector valve bore among a plurality of spaced apart positions arranged sequentially as first active, first neutral, second active, second neutral and third active and operative in said active positions to alternately connect the motor ports to the pressure and drain ports and operative in the neutral positions to connect all motor parts to the drain port; a metering valve axially movably carried in the metering valve bore and biased in one direction to a first condition metering fluid flow from the inlet to the pressure port, said metering valve having a piston portion in said chamber and further having orifice means therein exposed to inlet pressure and leading to said chamber for pressurizing said piston portion to move the metering valve to its second condition; said housing having an exhaust outlet for said chamber; a regulating valve biased to close said outlet and shiftable selectively first and second to open positions for respectively providing slow and fast rates of exhaust from said outlet; and actuating means on the selector valve engaging the regulating valve for incurring the closed position of said regulating valve in any active position of the selector valve and for incurring the first and second open positions of said regulating valve respectively according to the first and second neutral positions of said selector valve.

20. The invention defined in claim 19, in which: the two bores are parallel; the regulating valve is shiftable along an axis normal to the axes of said bores and has a cam follower end portion proximate to the selector valve; and said selector valve has cam portions thereon engageable with said follower portion and comprising said actuating means.

References Cited in the file of this patent

UNITED STATES PATENTS

| | | |
|---|---|---|
| 2,722,296 | Stoeckicht | Nov. 1, 1955 |
| 2,809,536 | O'Malley | Oct. 15, 1957 |
| 2,832,231 | Edsall | Apr. 29, 1958 |
| 2,929,478 | Tuck et al. | Mar. 22, 1960 |